(12) United States Patent
Pham et al.

(10) Patent No.: US 7,246,499 B2
(45) Date of Patent: Jul. 24, 2007

(54) ADAPTIVE AUTOMOTIVE CLIMATE CONTROL WITH VARIABLE LEARNING RATE

(75) Inventors: Chuck Pham, Canton, MI (US); Peter Gawthrop, Troy, MI (US); Aaron Tweadey, Farmington Hills, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 436 days.

(21) Appl. No.: 10/820,912

(22) Filed: Apr. 8, 2004

(65) Prior Publication Data

US 2005/0077037 A1    Apr. 14, 2005

Related U.S. Application Data

(60) Provisional application No. 60/510,851, filed on Oct. 14, 2003.

(51) Int. Cl.
*F25D 29/00*    (2006.01)

(52) U.S. Cl. .............................. 62/161; 62/162; 62/244

(58) Field of Classification Search .................. 62/132, 62/157, 161, 162, 163, 164, 231, 244; 700/28, 700/47, 276, 299, 300
See application file for complete search history.

(56) References Cited

U.S. PATENT DOCUMENTS 4,460,035 A    7/1984    Mizote et al.
5,511,724 A    4/1996    Freiberger et al.
5,579,994 A    12/1996   Davis, Jr. et al.
5,712,625 A    1/1998    Murphy
5,729,989 A *  3/1998    Sunaga et al. ................. 62/126
6,435,417 B1 * 8/2002    Holdgrewe et al. ....... 236/46 R
6,488,213 B2   12/2002   Ohga et al.
2003/0160104 A1  8/2003  Kelly et al.
2003/0204292 A1  10/2003 Wang et al.

* cited by examiner

*Primary Examiner*—Cheryl Tyler
*Assistant Examiner*—Huseyin Koca
(74) *Attorney, Agent, or Firm*—Brinks Hofer Gilson & Lione

(57) ABSTRACT

An air conditioner for an automobile having a passenger compartment comprising is provided, including an air control system to control a property of air entering the passenger compartment, a manual setting member through which the property of the air is manually controlled, and a control system that automatically controls the property of the air based on a control characteristic. The control system updates the control characteristic based on an input from the manual setting member and based on a variable learning rate. The variable learning rate may be based on a time value measured between a first adjustment of the manual setting member and a second adjustment of the manual setting member and based on a magnitude of the second adjustment of the manual setting member. The property of the air entering the passenger compartment may be volumetric flow rate or temperature.

19 Claims, 7 Drawing Sheets

ADAPTIVE AUTOMOTIVE CLIMATE CONTROL WITH VARIABLE LEARNING RATE

CROSS-REFERENCE TO RELATED APPLICATIONS

The present invention claims priority to U.S. Provisional Application Ser. No. 60/510,851 entitled "ADAPTIVE AUTOMOTIVE CLIMATE CONTROL WITH VARIABLE LEARNING RATE," filed Oct. 14, 2003, and incorporated in its entirety by this reference.

BACKGROUND

The present invention relates generally to an air conditioner for automotive vehicles, and more particularly to a control system that automatically controls air entering a passenger compartment of the automotive vehicle based on a control characteristic.

An important feature for an air conditioner is an adaptive control system that develops a control characteristic based on manual adjustments made by a vehicle occupant. The control system "learns" a vehicle occupant's climate control preferences by analyzing the occupant's manual setting adjustments corresponding to various environmental conditions. The control system then automatically adjusts the air conditioning settings when similar environmental conditions reoccur.

Currently, adaptive control systems may generate an inaccurate control characteristic based on atypical manual setting adjustments by the occupant, or by frequent or over-exaggerated manual setting adjustments. Additionally, current systems may be slow to create a control characteristic due to infrequent manual setting adjustments by vehicle occupants. Therefore, it is desirous to improve the accuracy and the response time of a control system adapting to an occupant's climate control preferences.

SUMMARY

In overcoming the disadvantages and drawbacks of the known technology, the current invention provides a system that improves the learning rate for an air conditioning control system.

One object of the current invention is to provide an air conditioning system for an automobile having a blower to direct air into the passenger compartment at a volumetric flow rate. The air conditioning system includes a manual setting blower member that manually controls the volumetric flow rate of the air directed into a passenger compartment of the automobile. The air conditioning system also includes a measurement system to measure an environmental condition and a control system that automatically controls the volumetric flow rate of the air directed into the passenger compartment based on a control characteristic.

Another object of the present invention is to generate the control characteristic based on a plurality of preferred blower settings, which correspond respectively to corresponding ranges of values of the environmental condition. Each of the plurality of preferred blower settings is determined based on a signal from the manual setting blower member occurring when the environmental condition is within the corresponding range of values of the environmental condition.

Yet another object of the present invention is to update the plurality of preferred blower settings at a variable learning rate that is based on a first input from the manual setting blower member and a second input from the manual setting blower member. The first input from the manual setting blower member corresponds to the frequency with which the manual setting blower member is adjusted. More specifically, the first input corresponds to a time value measured between a first adjustment of the manual setting blower member and a second adjustment of the manual setting blower member. The second input corresponds to a magnitude of the second adjustment of the manual setting blower member. Therefore, a vehicle occupant who makes frequent adjustments of the manual knobs will result in a slower learning rate than a vehicle occupant who makes infrequent adjustments of the manual knobs. Similarly, a vehicle occupant who makes drastic changes to the manual knobs will result in a slower learning rate than a vehicle occupant who makes subtle adjustments of the manual knobs.

The current invention may also include a temperature controller to control a temperature of the air directed into the passenger compartment, a manual setting temperature member that manually controls the temperature of the air directed into the passenger compartment, and a second control system that automatically controls the temperature of the air directed into the passenger compartment based on a second control characteristic. The second control characteristic is determined based on a plurality of preferred blower settings that are determined in a manner similar to that described above with respect to the preferred temperature settings. The second control characteristic is updated at a second variable learning rate that is determined in a manner similar to that described above with respect to the preferred temperature settings.

The control characteristics may each be determined by an algorithm corresponding to the preferred blower settings and the preferred temperature settings respectively. The algorithm may be a least squares curve fit calculation. The environmental conditions may include an ambient temperature adjacent the automobile, a sun load adjacent to the automobile, a temperature in the passenger compartment of the automobile, and humidity in the passenger compartment of the automobile.

BRIEF DESCRIPTION OF THE DRAWINGS

FIG. 4a is a graph of an ambient temperature-based blower control characteristic generated by the ambient temperature-based blower control system shown in FIG. 3a;

DETAILED DESCRIPTION

Figure 1:
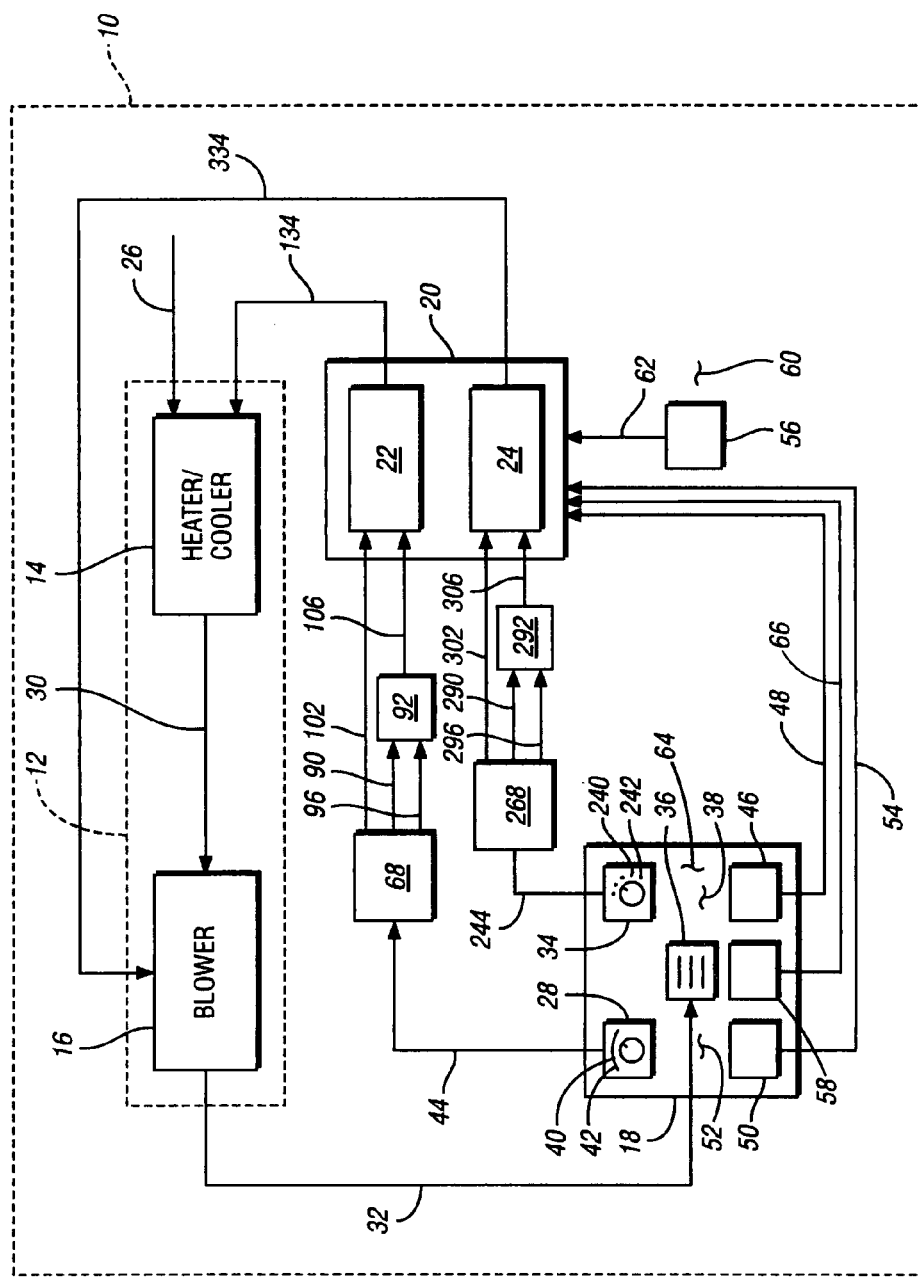
FIG. 1 is a flowchart for an air conditioner including an air conditioner control system having a heater/cooler control system and a blower control system, a temperature learning point detector, and a blower learning point detector embodying the principles of the present invention.

Referring now to the present invention, FIG. 1 shows an air conditioner 10 having an air management system 12 including a heater/cooler 14 and a blower 16 in fluid communication with a passenger compartment 18 of a vehicle (not shown). The air conditioner 10 also includes a control system 20 that has a heater/cooler controller 22 and a blower controller 24.

During operation of the air conditioner 10, ambient air 26 enters the heater/cooler 14 where it may be heated or cooled based on the heater/cooler controller 22 and based on the setting of a manual temperature knob 28, which will be discussed in further detail below. Next, air 30 from the heater/cooler 14 enters the blower 16 in order to control the volumetric flow rate of air 32 exiting from the blower 16. The volumetric flow rate of the air 32 is controlled based on the blower controller 24 and based on the setting of a manual blower knob 34, which will be discussed in further detail below. Alternatively, ambient air 26 may enter the blower 16 before entering the heater/cooler 14. The air 32 is next directed into the passenger compartment 18 of the automobile via a blower vent 36, in order to condition the interior climate of the passenger compartment 18 for the benefit of a vehicle occupant (not shown).

The vehicle occupant may adjust the manual temperature knob 28 in order to manually control the passenger compartment temperature 38 as desirable. Similarly, the occupant may adjust the manual blower knob 34 in order to control the volumetric flow rate of the air 32 directed into the passenger compartment 18 as desirable. When the vehicle occupant adjusts the manual temperature knob 28, such as from a first position 40 to a second position 42, a manual temperature knob signal 44 is sent to the heater/cooler controller 22. The manual temperature knob signal 44 contains information regarding the time that the manual temperature knob 28 was adjusted and the magnitude of the adjustment. Preferably simultaneously, an environmental condition sensor sends a signal to the heater/cooler controller 22 via the control system 20.

One such environmental condition sensor may be a passenger temperature sensor 46 located in the passenger compartment 18 of the motor vehicle. The passenger temperature sensor 46 sends a passenger temperature signal 48 to the heater/cooler controller 22 via containing information regarding the passenger compartment temperature 38 obtained from the passenger temperature sensor 46 at the time of the adjustment of the manual temperature knob 28. Using the information from the passenger temperature signal 48 and the manual temperature knob signal 44, the heater/cooler controller 22 determines the user's preferred manual temperature knob positioning at the respective passenger compartment temperature 38. The heater/cooler controller 22 then automatically adjusts the output of the heater/cooler 14 based on the earlier-determined user preferences.

Another such environmental condition sensor may be a sun load sensor 50 that measures sun load 52 and sends a sun load signal 54 to the heater/cooler controller 22 via the control system 20. The sun load sensor 50 may be located within the passenger compartment 18 of the motor vehicle, and is preferably located on the vehicle dashboard (not shown).

Yet another environmental condition sensor may be an ambient temperature sensor 56 that measures the ambient temperature 60 and sends an ambient temperature signal 62 to the heater/cooler controller 22 via the control system 20. The ambient temperature sensor 56 is preferably located external to the passenger compartment 18 of the motor vehicle.

Finally, another environmental condition sensor may be a passenger compartment humidity sensor 58 that measures the passenger compartment humidity 64 and sends a passenger compartment humidity signal 66 to the heater/cooler controller 22 via the control system 20. The passenger compartment humidity sensor 58 is preferably located within the passenger compartment 18 of the motor vehicle.

In one aspect of the present invention, the manual temperature knob signal 44 may be sent to a temperature learning point detector 68 before traveling to the heater/cooler controller 22. The temperature learning point detector 68 determines if the manual adjustment of the manual temperature knob 28 should be considered by the heater/cooler controller 22. Generally, the learning point detector 68 determines whether the vehicle occupant is satisfied with the passenger compartment temperature 38. As will be discussed in further detail below, the learning point detector 68 determines whether the vehicle occupant is satisfied with the passenger compartment temperature 38 by analyzing the time elapsed since the last manual temperature knob 28 adjustment.

Figure 2A:
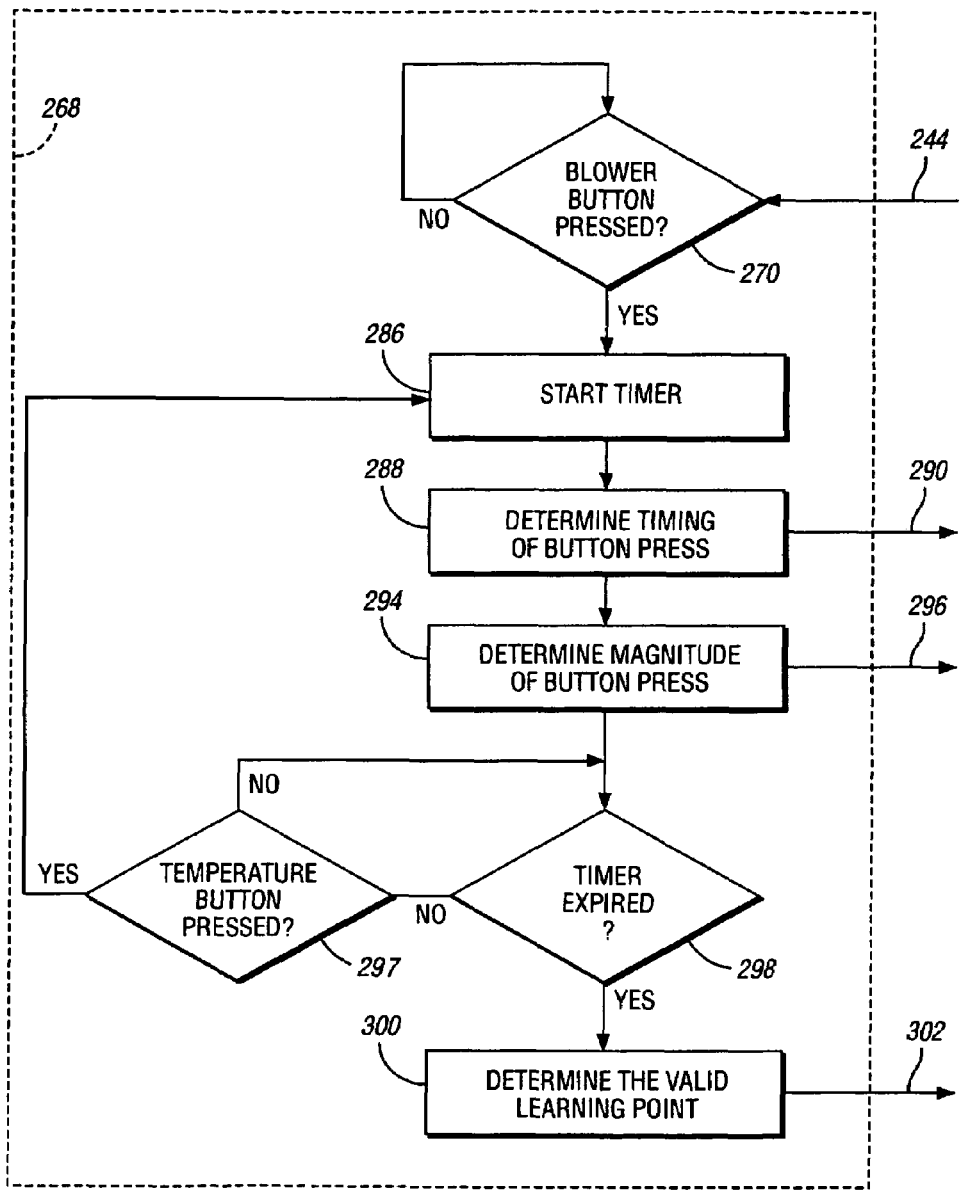
FIG. 2a is a flowchart for the blower learning point detector shown in FIG. 1.
Figure 2B:
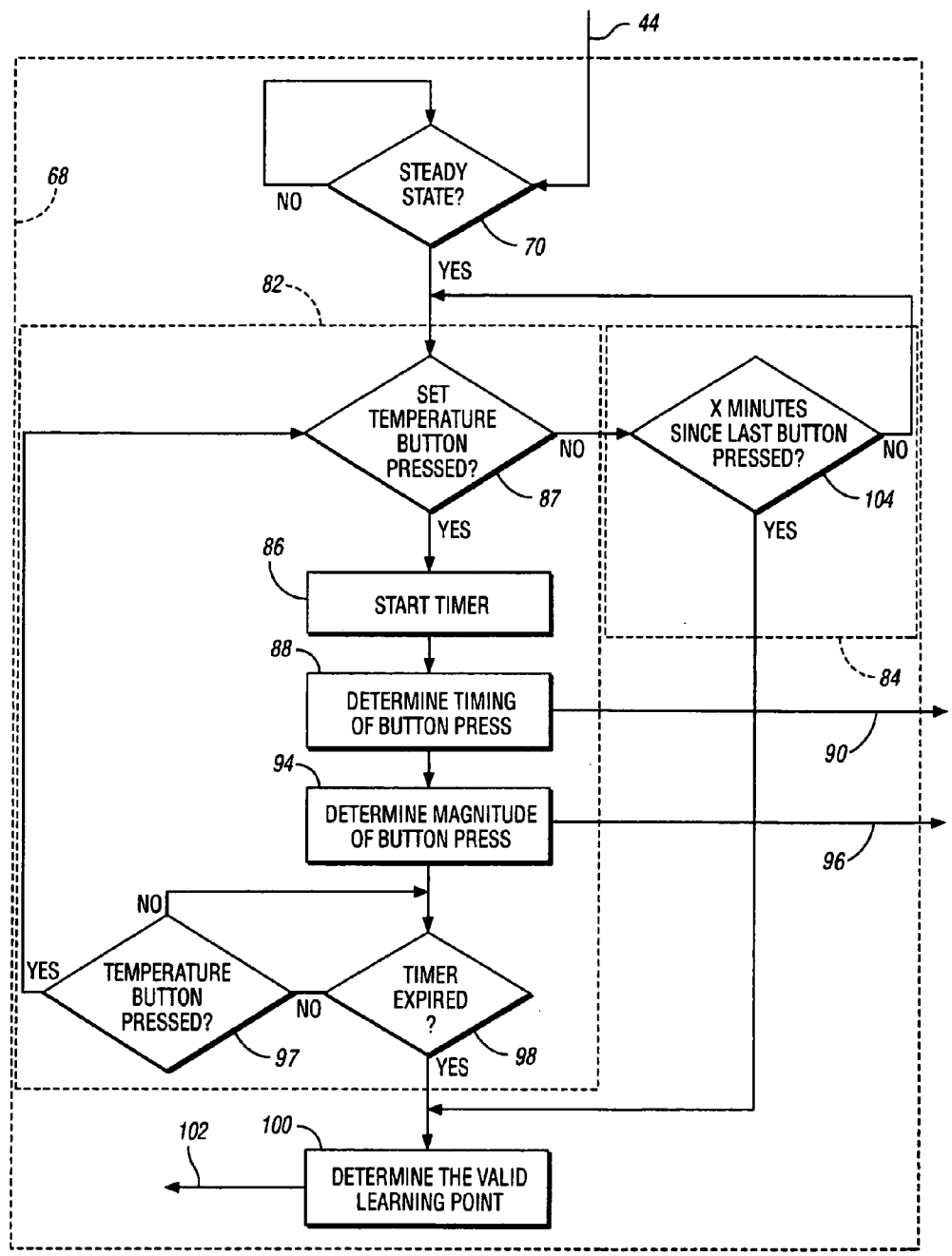
FIG. 2b is a flowchart of the temperature learning point detector shown in FIG. 1 having a steady state detector.

As shown in FIG. 2b, the temperature learning point detector 68 inputs the manual temperature knob signal 44 into a steady state detector 70 that determines whether the air conditioner 10 is in a steady state condition. The learning point detector 68 will only analyze signals sent while the air conditioner 10 is in a steady state condition, because non-steady state conditions often produce unreliable learning points. More specifically, during transient conditions, such as cooler cool down or heater warm up, the vehicle occupant will tend to dramatically adjust the manual temperature knob 28 in order to more quickly reach a desired passenger compartment temperature 38. However, the occupant's dramatic adjustments do not usually speed-up the heating or cooling process because the air conditioner 10 is already operating at its capacity.

Figure 2C:
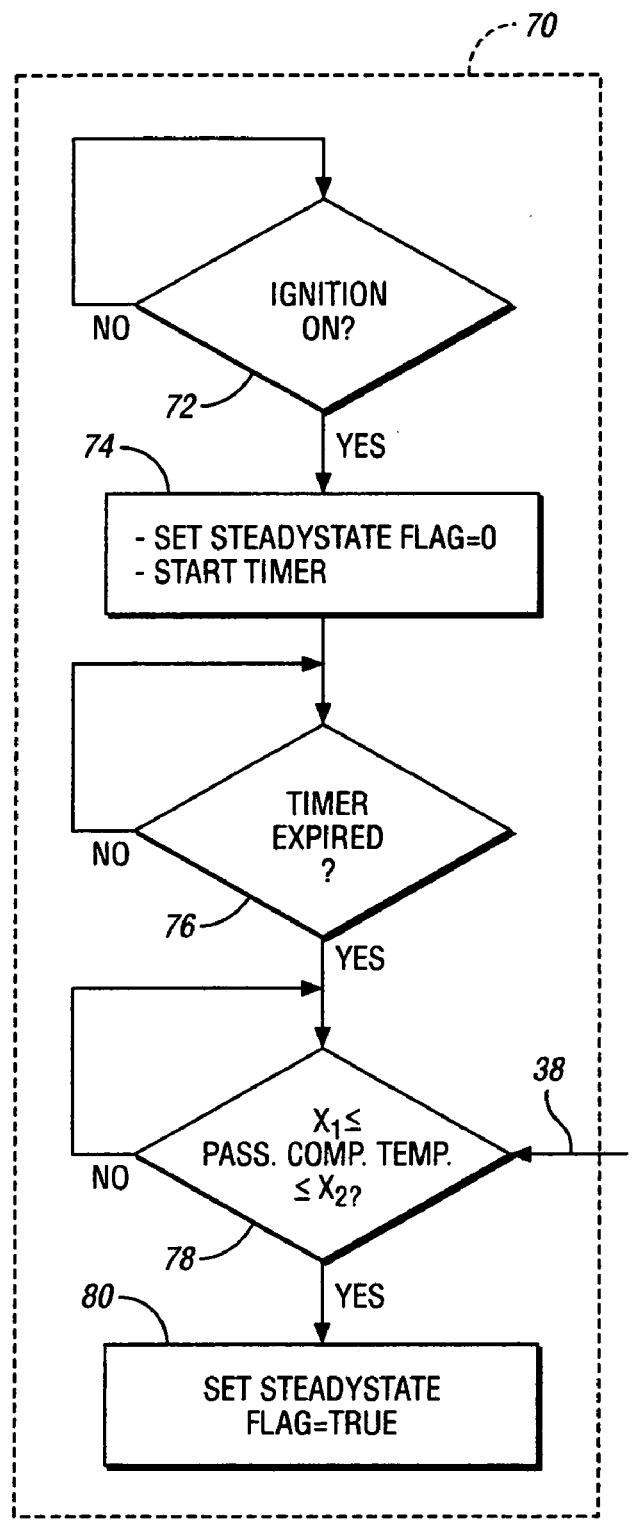
FIG. 2c is a flowchart of the steady state detector shown in FIG. 2b.

As shown in FIG. 2c, the steady state detector 70 includes a first step 72 of determining whether the vehicle ignition is on. Once the vehicle ignition is on, the steady state detector 70 sets a steady state flag equal to "false" and starts a timer in a second step 74. Next, in a third step 76, the steady state detector 70 determines whether a preset timer has expired. Once the preset timer expires, the steady state detector 70 proceeds to a fourth step 78 in order to evaluate whether the passenger compartment temperature 38 is within a predetermined range of temperatures, ×1 to ×2. The predetermined range of temperatures ×1 to ×2 may be any appropriate temperature range. However, in a preferred embodiment ×1 is equal to 50° Fahrenheit and ×2 is equal to 85° Fahrenheit. If the passenger compartment temperature 38 is not within ×1 and ×2, the steady state flag will continue to be set to "false" until the passenger compartment temperature 38 is within ×1 and ×2. Once the passenger compartment temperature 38 is within ×1 and ×2, the steady state detector 70 will set the steady state flag equal to "true" in a fifth step 80, and the air conditioner 10 will operate in a steady state condition.

Alternatively, the fourth step 78 of the steady state detector 70 determines whether the passenger compartment temperature 38 is within a predetermined "buffer range" of the temperature knob 28 setting. For example, if the predetermined buffer range is 10° Fahrenheit, the passenger compartment temperature 38 is 62° Fahrenheit, and the temperature knob 28 is set at 70° Fahrenheit, then the steady state flag will be set to "true" because 62° Fahrenheit is within 10° Fahrenheit of 70° Fahrenheit.

Referring back to FIG. 2b, once the steady state flag is equal to "true", the temperature learning point detector 68 determines whether a valid learning point has been generated. As discussed above, a valid learning point occurs when the vehicle occupant has not adjusted the manual temperature knob 28 for a predetermined amount of time, y. As shown in FIG. 2b, a valid learning point may occur via a first sequence of events 82 or via a second sequence of events 84.

Describing the first sequence of events 82, once the manual temperature knob 28 is adjusted, the temperature learning point detector 68 sends a "yes" signal to a timer 86 via a first step 87. After the timer 86 starts running, a timing controller 88 determines the time between the most recent manual temperature knob 28 adjustment and the previous manual temperature knob 28 adjustment. The timing controller 88 then sends a timing signal 90 to a temperature variable learning controller 92 shown in FIG. 1, which will be discussed in further detail below.

Next, the temperature learning point detector 68 determines the magnitude of the most recent manual temperature knob 28 adjustment via a magnitude controller 94, which sends a magnitude signal 96 to the temperature variable learning controller 92. For example, if the air conditioner 10 was in a steady state condition and the vehicle occupant adjusted the manual temperature knob 28 from 68° Fahrenheit to 64° Fahrenheit, the magnitude controller 94 would send a magnitude signal 96 corresponding to 4° Fahrenheit to the temperature variable learning controller 92.

Next, a second step 97 determines if the manual temperature knob 28 has been adjusted by the occupant during the time while the timer 86 is running. If the temperature knob 28 has been adjusted during this time, then the timer 86 is reset and the previous adjustment is not a valid learning point.

Finally, once the timer 86 has expired without an additional manual temperature knob adjustment by the occupant, a third step 98 sends a yes signal to the learning point controller 100. The learning point controller 100 next sends a valid learning point signal 102 to the heater/cooler controller 22.

Referring to the second sequence of events 84 by which a valid learning point can occur, if a predetermined amount of time y has passed since the manual temperature knob 28 was last adjusted, a third step 104 in the temperature learning point detector 68 will send a yes signal to the learning point controller 100.

The first sequence of events 82 and the second sequence of events 84 will now be further described by way of two example scenarios. In the first scenario, corresponding to the first sequence of events 82, the air conditioner 10 is in a steady state condition and the vehicle operator adjusts the manual temperature knob 28 starting the timer 86. If the vehicle occupant does not re-adjust the manual temperature knob 28 before the timer 86 expires, then the learning point controller 100 will send a valid learning point signal 102 to the heater/cooler controller 22.

In the second scenario, corresponding to the second sequence of events 84, the air conditioner 10 is in a steady state condition the and the vehicle occupant has not adjusted the manual temperature knob 28 in the previous y amount of time. The learning point controller 100 then sends a valid learning point signal 102 to the heater/cooler controller 22.

Referring to FIG. 1, the temperature variable learning controller 92 determines a temperature learning rate signal 106, which will be discussed in further detail below, and inputs the temperature learning rate signal 106 to the heater/cooler controller 22.

Figure 3A:
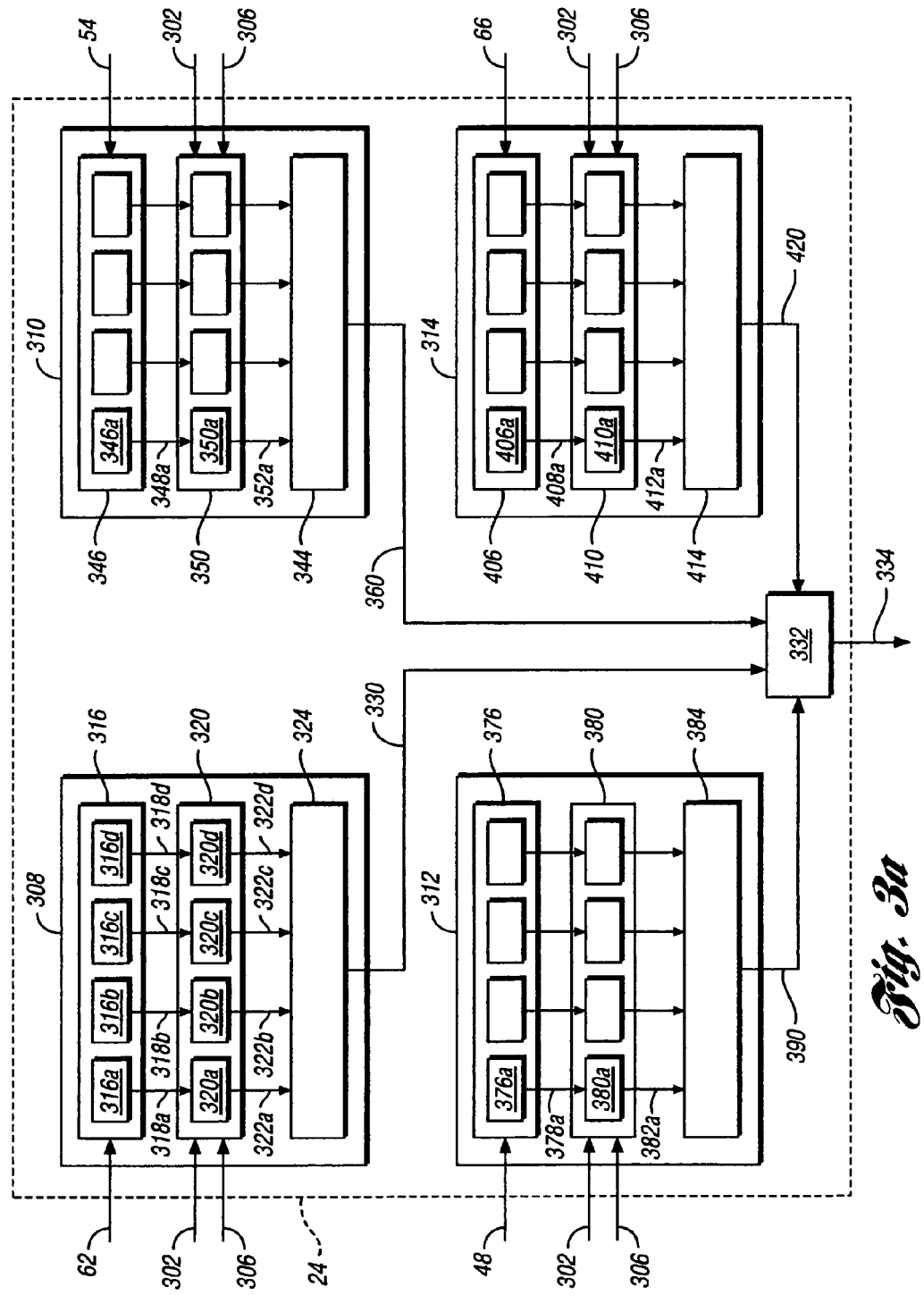
FIG. 3a is a flowchart of the blower control system shown in FIG. 1 having an ambient temperature-based blower control system, a sun load-based blower control system, a passenger compartment temperature-based blower control system, and a humidity-based blower control system.
Figure 3B:
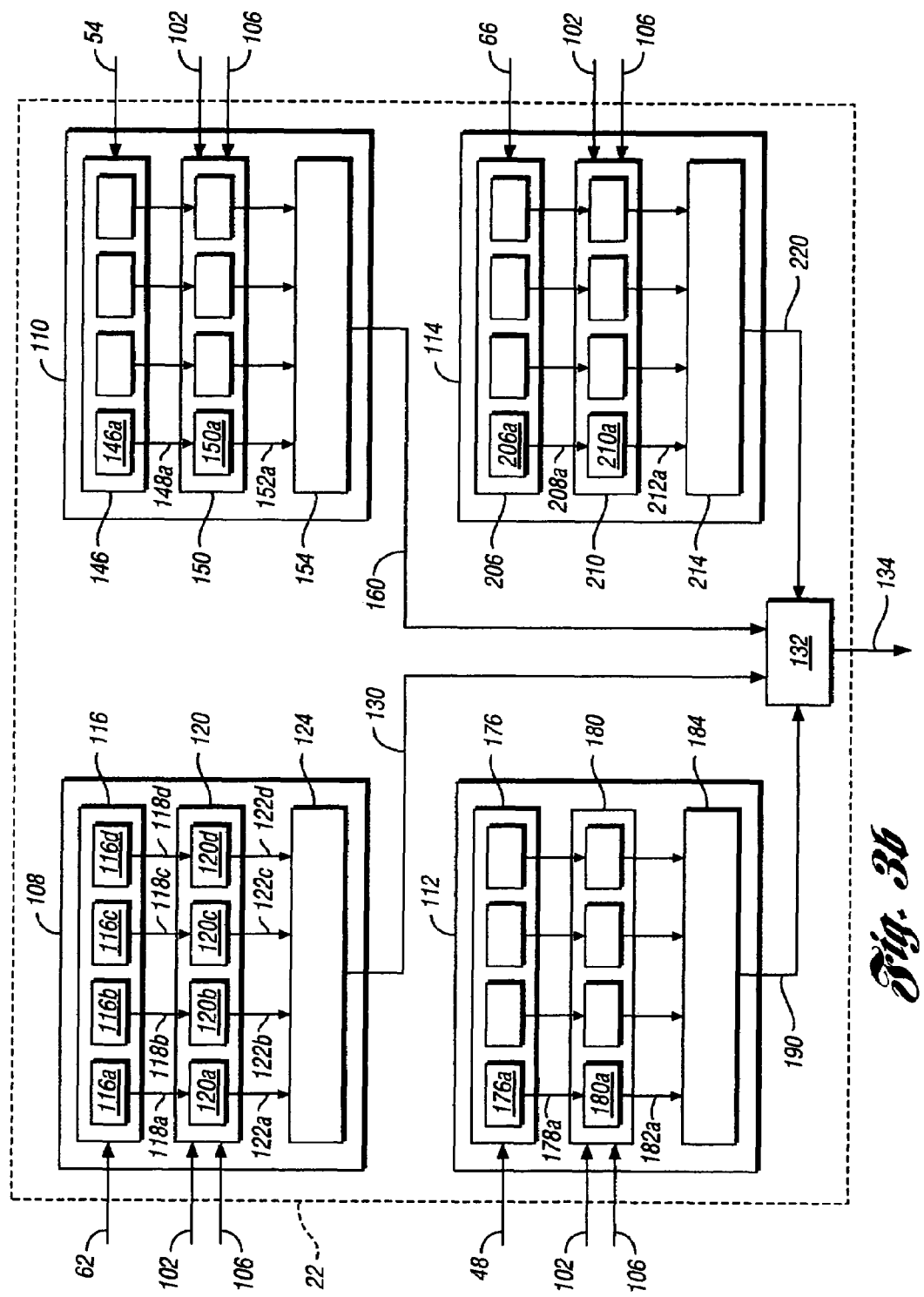
FIG. 3b is a flowchart of the heater/cooler control system shown in FIG. 1 having an ambient temperature-based heater/cooler control system, a sun load-based heater/cooler control system, a passenger compartment temperature-based heater/cooler control system, and a humidity-based heater/cooler control system.

Referring to FIG. 3b, the heater/cooler controller 22 will now be discussed in more detail. The heater/cooler controller 22 preferably includes an ambient temperature-based heater/cooler control system 108, a sun load-based heater/cooler control system 110, and a passenger compartment temperature-based heater/cooler control system 112. Additionally, the heater/cooler controller 22 may include a humidity-based heater/cooler control system 114. However, the heater/cooler controller 22 need not include all four control systems 108, 110, 112, 114. Additional and/or alternative control systems may be used which operate based on other appropriate environmental condition inputs.

The ambient temperature-based heater/cooler control system 108 includes a bin separator 116 that receives the ambient temperature signal 62 from the ambient temperature sensor 56. The bin separator 116 includes a predetermined number of bins, such as bins 116a, 116b, 116c, and 116d shown in FIG. 3b. Each of the bins 116a, 116b, 116c, and 116d respectively represents a range of ambient temperature values. For example, bin 116a may represent ambient temperature values below 32° Fahrenheit, bin 116b may represent ambient temperature values from 32° Fahrenheit to 50° Fahrenheit, bin 116c may represent ambient temperature values from 50° Fahrenheit to 70° Fahrenheit, and bin 116d may represent ambient temperature values over 70° Fahrenheit. Preferably, the bin separator 116 includes at least five bins in order to more accurately determine the preferences of the vehicle occupant. More preferably, the bin separator 116 includes between five and ten bins. However, any appropriate number of bins may be used. The bin separator 116 determines which of the bins 116a, 116b, 116c, and 116d correlates to the ambient temperature signal, and sends a correlating signal 118a, 118b, 118c, or 118d to a bin calculator 120.

The bin calculator 120 includes the same number of bins 120a, 120b, 120c, and 120d as the bin separator 116, and receives the valid learning point signal 102 and the temperature learning rate signal 106. The bin calculator 120 then inputs a valid learning point value from the valid learning point signal 102, which correlates to the vehicle occupant's corresponding temperature adjustments, into the corresponding bin 120a, 120b, 120c, and 120d. The bin calculator 120 next calculates a new, updated value for the relevant bin 120a, 120b, 120c, or 120d based on the valid learning point signal 102, the existing value within relevant bin 120a, 120b, 120c, or 120d, and the temperature learning rate signal 106.

The ambient temperature-based heater/cooler control system 108 will now be discussed in further detail by way of an example scenario. In this example scenario the vehicle occupant adjusts the manual temperature knob 28 to a value corresponding to 72° Fahrenheit while the ambient temperature is 60° Fahrenheit. Additionally, the ambient temperature-based heater/cooler control system 108 in this example scenario previously determined that the vehicle occupant prefers a manual temperature knob 28 setting corresponding to 68° Fahrenheit when the ambient temperature is between 50° Fahrenheit and 70° Fahrenheit. Once the manual temperature knob 28 is adjusted, the manual temperature knob signal 44 is inputted into the temperature learning point detector 68. If the temperature learning point detector 68 determines that the air conditioner 10 is in a steady state condition and that the manual adjustment is a valid learning point, then the ambient temperature signal 62 will input the value 60° Fahrenheit into the bin separator 116. The bin separator 116 then inputs a signal to the bin 116c, which corresponds to ambient temperature values from 50° Fahrenheit to 70° Fahrenheit, and the signal 118c will be sent to the bin calculator 120. The signal 118c will indicate to bin 120c that the value of the valid learning point signal 102, which is 72° Fahrenheit, should be entered into bin 120c. The bin calculator 120 then determines a new value for bin 120c based on the old bin value of 68° Fahrenheit, the new bin value of 72° Fahrenheit, and the temperature learning rate signal 106. More specifically, the following formula may be used to determine the new value for bin 120c: NV=OV*(1−x)+IV*x, where NV is the new value for bin 120c, OV is the old value for bin 120c (68° Fahrenheit), IV is the inputted value (72° Fahrenheit), and x is a percentage corresponding to the temperature learning rate signal 106.

Referring to FIGS. 1 and 3b, the temperature learning rate signal 106 is inputted into the heater/cooler controller 22 from the temperature variable learning controller 92. The temperature variable learning controller 92 determines a temperature variable learning rate based on the timing signal 90 and the magnitude signal 96. More specifically, the temperature variable learning rate is determined based on the frequency with which the manual temperature knob 28 is adjusted, and based on the magnitude with which the manual temperature knob 28 is adjusted. The temperature variable learning rate may be calculated with any appropriate formula. Once such formula is as follows: VLR=k1*($T_{elapsed}$*k2+ΔN*k3), where VLR is the temperature variable learning rate, k1, k2, and k3 are system constants determined during a calibration phase, $T_{elapsed}$ is a variable corresponding to the timing signal 90, and ΔN is a variable corresponding to the magnitude signal 96. A second possible formula is as follows: NVLR=OLVR+k1*[($T_{elapsed}$−$T_{offset}$)*k2+(ΔN−$N_{offset}$)*k3], where NLVR is the new temperature variable learning rate, OLVR is the old temperature variable learning rate, k1, k2, and k3 are system constants, $T_{elapsed}$ corresponds to the timing signal 90, $T_{offset}$ is a predetermined constant, ΔN is a variable corresponding to the magnitude signal 96, and $N_{offset}$ is a predetermined constant. This formula is a composite formula, based on the previous variable learning rate signal, which is adjusted based on the frequency with which the manual temperature knob 28 is adjusted and the magnitude of such adjustment. The predetermined constants, $T_{offset}$ and $N_{offset}$ may be determined based on the time between temperature adjustments for an average vehicle occupant and based on the average magnitude of an adjustment for an average vehicle occupant.

Figure 4A:
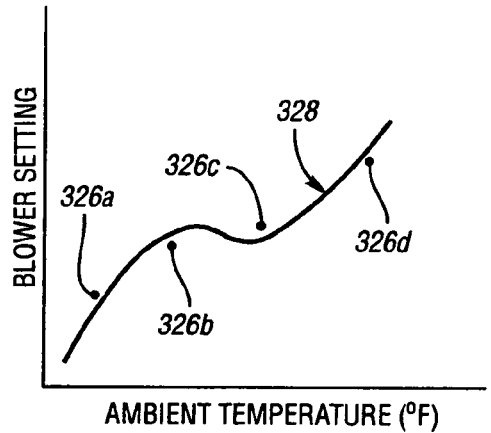
Figure 4B:
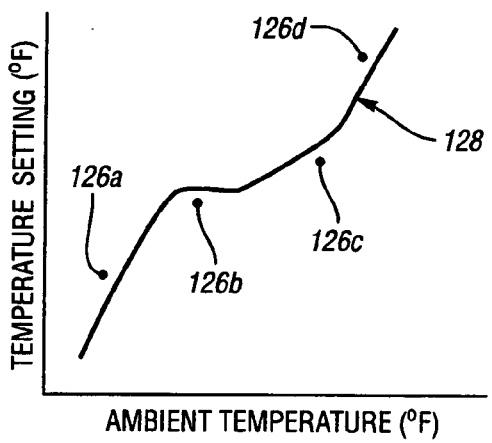
FIG. 4b is a graph of an ambient temperature-based heater/cooler control characteristic generated by the ambient temperature-based heater/cooler control system shown in FIG. 3b.

Once the bin calculator has updated the relevant bin 120a, 120b, 120c, or 120d, as seen in FIG. 3b, the bin calculator 120 sends a signal 122a, 122b, 122c, and 122d from each of the bins 120a, 120b, 120c, and 120d to an ambient temperature-based heater/cooler control characteristic calculator 124. As shown in FIG. 4b, the ambient temperature-based heater/cooler control characteristic calculator 124 inputs an updated value 126a, 126b, 126c, and 126d from each of the respective bins 120a, 120b, 120c, and 120d in order to determine an ambient temperature-based heater/cooler control characteristic 128. The ambient temperature-based heater/cooler control characteristic 128 is an approximation of the vehicle occupant's heater/cooler setting preferences at various ambient temperatures, such as an algorithm that approximates the updated value 126a, 126b, 126c, and 126d. The algorithm may be determined using a least squares curved fit calculation, which is a well-known mathematical model for fitting a curve to a given set of data points resulting in the minimal sum of the deviations squared.

Referring to FIGS. 1 and 3b, the ambient temperature-based heater/cooler control characteristic calculator 124 sends an ambient temperature-based heater/cooler control characteristic signal 130 to a signal determiner 132. The signal determiner 132 may also input similar signals from the sun load-based heater/cooler control system 110, the passenger compartment temperature-based heater/cooler control system 112, and the humidity-based heater/cooler control system 114. The signal determiner 132 then determines which of the four control systems 108, 110, 112, or 114 to obey. Next, a heater/cooler control characteristic signal 134 corresponding to one of the four control systems 108, 110, 112, or 114 is sent to the heater/cooler 14. The signal determiner 132 may have a predetermined hierarchy between the four control systems 108, 110, 112, and 114, or it may establish a hierarchy based on the preferences of the vehicle occupant.

In one alternative, the signal determiner 132 may combine two or more of the respective signals from the heater/cooler control systems 108, 110, 112, and 114 such that the heater/cooler control characteristic signal 134 is a hybrid signal based on more than one of the environmental condition signals 46, 50, 56, and 58. In one such hybrid signal, two of the heater/cooler control systems 108, 110, 112, and 114 generate a signal that generates a curve, such as the ambient temperature-based heater/cooler control characteristic 128 in FIG. 4b. Each of the two curves is plotted on a respective axis of a three-axis graph, and then each of the two curves is intersected by a plane. The two planes intersect in a curve, which the signal determiner 132 outputs as the heater/cooler control characteristic signal 134.

In another alternative, a hybrid control system (not shown) may include bins corresponding to two or more variables in order to determine a hybrid control characteristic signal (not shown). For example, the hybrid control system may include a two-dimensional matrix of bins (not shown) having a first environmental condition on a first axis and a second environmental condition on a second axis. More specifically, if the first environmental condition is ambient temperature and the second environmental condition is sun load then the hybrid control system may have five ambient temperature ranges and three sun load ranges. In this example, the hybrid control system would have a total of fifteen bins, each bin corresponding to a particular range of ambient temperatures and a particular range of sun load values. The hybrid control system will then generate a hybrid control characteristic for the matrix of sixteen bins and then send the hybrid control characteristic signal to the heater/cooler 14.

Referring to FIG. 3b, the sun load-based heater/cooler control system 110, the passenger compartment temperature-based heater/cooler control system 112, and the humidity-based heater/cooler control system 114 will now be discussed in more detail. The sun load-based heater/cooler control system 110 includes a bin separator 146 that receives the sun load signal 54 from the sun load sensor 50. The bin separator 146 includes a predetermined number of bins, such as bin 146a, each of which represents a range of sun load values. The bin separator 146 determines which bin 146a correlates to the sun load signal 54, and sends a correlating signal 148a to a bin calculator 150. The bin calculator 150 receives the valid learning point signal 102 and the temperature learning rate signal 106 and inputs a valid learning point value from the valid learning point signal 102 into the corresponding bin 150a. The bin calculator 150 next calculates a new, updated value for the relevant bin 150a based on the valid learning point signal 102, the existing value within relevant bin 150a, and the temperature learning rate signal 106. Finally, a sun load-based heater/cooler control characteristic calculator 154 inputs an updated value 152a from each of the respective bins 150a in order to determine sun load-based heater/cooler control characteristic 160, which is inputted to the signal determiner 132.

The passenger compartment temperature-based heater/cooler control system 112 includes a bin separator 176 that receives the passenger compartment temperature signal 48 from the passenger compartment temperature sensor 46. The bin separator 176 includes a predetermined number of bins, such as bin 176a, each of which represents a range of passenger compartment temperature values. The bin separator 176 determines which bin 176a correlates to the passenger compartment temperature signal 48, and sends a correlating signal 178a to a bin calculator 180. The bin calculator 180 receives the valid learning point signal 102 and the temperature learning rate signal 106 and inputs a valid learning point value from the valid learning point signal 102 into the corresponding bin 180a. The bin calculator 180 next calculates a new, updated value for the relevant bin 180a based on the valid learning point signal 102, the existing value within relevant bin 180a, and the temperature learning rate signal 106. Finally, a passenger compartment temperature-based heater/cooler control characteristic calculator 184 inputs an updated value 182a from each of the respective bins 180a in order to determine a passenger compartment temperature-based heater/cooler control characteristic 190, which is inputted to the signal determiner 132.

The humidity-based heater/cooler control system 114 includes a bin separator 206 that receives the passenger compartment humidity signal 66 from the passenger compartment humidity sensor 58. The bin separator 206 includes a predetermined number of bins, such as bin 206a, each of which represents a range of passenger compartment humidity values. The bin separator 206 determines which bin 206a correlates to the passenger compartment humidity signal 66, and sends a correlating signal 208a to a bin calculator 210. The bin calculator 210 receives the valid learning point signal 102 and the temperature learning rate signal 106 and inputs a valid learning point value from the valid learning point signal 102 into the corresponding bin 180a. The bin calculator 180 next calculates a new, updated value for the relevant bin 210a based on the valid learning point signal 102, the existing value within relevant bin 210a, and the temperature learning rate signal 106. Finally, a passenger compartment humidity-based heater/cooler control characteristic calculator 214 inputs an updated value 212a from each of the respective bins 210a in order to determine a passenger compartment humidity-based heater/cooler control characteristic 220, which is inputted to the signal determiner 132.

Referring back to FIG. 1, the vehicle occupant's blower setting preferences will now be discussed in more detail. The vehicle occupant may adjust the manual blower knob 34 in order to control the volumetric flow rate of the air 32 directed into the passenger compartment 18 as desirable. When the vehicle occupant adjusts the manual blower knob 34, such as from a first position 240 to a second position 242, a manual blower knob signal 244 is sent to the blower controller 24. The manual blower knob signal 244 contains information regarding the time that the manual blower knob 34 was adjusted and the magnitude of the adjustment. Preferably simultaneously, one of the environmental condition sensors 46, 50, 56, and 58 sends a signal to the blower controller 24 via the control system 20.

In one aspect of the present invention, the manual blower knob signal 244 may be sent to a blower learning point detector 268 before traveling to the blower controller 24. The blower learning point detector 268 determines whether the vehicle occupant is satisfied with the blower settings by analyzing the time elapsed since the last manual blower knob 34 adjustment.

As shown in FIG. 2a, the blower learning point detector 268 inputs the manual blower knob signal 244 into a first step 270 that determines whether the manual blower knob 34 has been pressed. Once the manual blower knob 34 is adjusted, the blower learning point detector 268 starts a timer 286. After the timer 286 is activated, a timing controller 288 determines the time between the most recent manual blower knob 34 adjustment and the previous manual blower knob 34 adjustment. The timing controller 288 then sends a timing signal 290 to a blower variable learning controller 292 shown in FIG. 1, which will be discussed in further detail below. Next, the blower learning point detector 268 determines the magnitude of the most recent manual blower knob 34 adjustment via a magnitude controller 294 which sends a magnitude signal 296 to the blower variable learning controller 292. Next, a second step 297 determines if the manual blower knob 34 has been adjusted by the occupant during the time while the timer 286 is running. If the manual blower knob 34 has been adjusted during this time, then the timer 286 is reset and the previous adjustment is not a valid learning point. Finally, once the timer 286 has expired without an additional manual blower knob adjustment by the occupant, a third step 298 sends a yes signal to a learning point controller 300. The learning point controller 300 next sends a valid learning point signal 302 to the blower controller 24.

Referring to FIG. 1, the blower variable learning controller 292 determines a blower learning rate signal 306, which is inputted into the blower controller 24 from the blower variable learning controller 292. The blower variable learning controller 292 determines a variable learning rate based on the timing signal 290 and the magnitude signal 296. More specifically, the blower variable learning rate is determined based on the frequency with which the manual blower knob 34 is adjusted, and based on the magnitude with which the manual blower knob 34 is adjusted. The blower variable learning rate may be calculated with any appropriate formula. Once such formula is as follows: VLR=k1*$(T_{elapsed}*k2+\Delta N*k3)$, where VLR is the blower variable learning rate, k1, k2, and k3 are system constants determined during a calibration phase, $T_{elapsed}$ is a variable corresponding to the timing signal 290, and $\Delta N$ is a variable corresponding to the magnitude signal 296.

Another possible formula is as follows: NVLR=OVLR+k1*$[(T_{elapsed}-T_{offset})*k2+(\Delta N-N_{offset})*k3]$, where NVLR is the new blower variable learning rate, OVLR is the old blower variable learning rate, k1, k2, and k3 are system constants, $T_{elapsed}$ corresponds to the timing signal 290, $T_{offset}$ is a predetermined constant, $\Delta N$ is a variable corresponding to the magnitude signal 296, and $N_{offset}$ is a predetermined constant. The predetermined constants, $T_{offset}$ and $N_{offset}$ may be determined based on the time between blower adjustments for an average vehicle occupant and based on the average magnitude of an adjustment for an average vehicle occupant.

Referring to FIG. 3a, the blower controller 24 will now be discussed in more detail. The blower controller 24 preferably includes an ambient temperature-based blower control system 308, a sun load-based blower control system 310, and a passenger compartment temperature-based blower control system 312. Additionally, the blower controller 24 may include a humidity-based blower control system 314. However, the blower controller 24 need not include all four control systems 308, 310, 312, 314. Additionally, alternative control systems may be used which operate based on other appropriate environmental condition inputs.

The ambient temperature-based blower control system 308 includes a bin separator 316 that receives the ambient temperature signal 62 from the ambient temperature sensor 56. The bin separator 316 includes a predetermined number of bins, such as bins 316a, 316b, 316c, and 316d. Each of the bins 316a, 316b, 316c, and 316d respectively represents a range of ambient temperature values. The bin separator 316 determines which of the bins 316a, 316b, 316c, and 316d correlates to the ambient temperature signal, and sends a correlating signal 318a, 318b, 318c, or 318d to a bin calculator 320.

The bin calculator 320 includes the same number of bins 320a, 320b, 320c, and 320d as the bin separator 316, and receives the valid learning point signal 302 and the blower learning rate signal 306. The bin calculator 320 then inputs a valid learning point value from the valid learning point signal 302, which correlates to the vehicle occupant's corresponding blower adjustments, into the corresponding bin 320a, 320b, 320c, and 320d. The bin calculator 320 next calculates a new, updated value for the relevant bin 320a, 320b, 320c, or 320d based on the valid learning point signal 302, the existing value within relevant bin 320a, 320b, 320c, or 320d, and the blower learning rate signal 306.

Once the bin calculator 320 has updated the relevant bin 320a, 320b, 320c, or 320d, the bin calculator 320 sends a signal 322a, 322b, 322c, and 322d from each of the bins 320a, 320b, 320c, and 320d to an ambient temperature-based blower control characteristic calculator 324. As shown in FIG. 4a, the ambient temperature-based blower control characteristic calculator 324 inputs an updated value 326a, 326b, 326c, and 326d from each of the respective bins 320a, 320b, 320c, and 320d in order to determine an ambient temperature-based blower control characteristic 328. The ambient temperature-based blower control characteristic 328 is an approximation of the vehicle occupant's blower setting preferences at various ambient temperatures, such as an algorithm that approximates the updated value 126a, 126b, 126c, and 126d. The algorithm may be determined using a least squares curved fit calculation.

Referring to FIGS. 1 and 3a, the ambient temperature-based blower control characteristic calculator 324 sends an ambient temperature-based blower control characteristic signal 330 to a signal determiner 332. The signal determiner 332 may also input similar signals from the sun load-based blower control system 310, the passenger compartment temperature-based blower control system 312, and the humidity-based blower control system 314. The signal determiner 332 then determines which of the four control systems 308, 310, 312, or 314 to obey. Next, a blower control characteristic signal 334 corresponding to one of the four control systems 308, 310, 312, or 314 is sent to the blower 16. In one alternative, the signal determiner 332 may combine two or more of the respective signals from the blower control systems 308, 310, 312, and 314 such that the blower control characteristic signal 334 is a hybrid signal based on more than one of the environmental condition signals 46, 50, 56, and 58. In another alternative, a hybrid control system may include bins corresponding to two or more variables in order to determine a hybrid control characteristic signal for the blower 16, as discussed above with respect to the heater/cooler 14.

Referring to FIG. 3a, the sun load-based blower control system 310, the passenger compartment temperature-based blower control system 312, and the humidity-based blower control system 314 will now be discussed in more detail. The sun load-based blower control system 310 includes a bin separator 346 that receives the sun load signal 54 from the sun load sensor 50. The bin separator 346 includes a predetermined number of bins, such as bin 346a, each of which represents a range of sun load values. The bin separator 346 determines which bin 346a correlates to the sun load signal 54, and sends a correlating signal 348a to a bin calculator 350. The bin calculator 350 receives the valid learning point signal 302 and the blower learning rate signal 306 and inputs a valid learning point value from the valid learning point signal 302 into the corresponding bin 350a. The bin calculator 350 next calculates a new, updated value for the relevant bin 350a based on the valid learning point signal 302, the existing value within relevant bin 350a, and the blower learning rate signal 306. Finally, a sun load-based blower control characteristic calculator 344 inputs an updated value 352a from each of the respective bins 350a in order to determine sun load-based blower control characteristic 360, which is inputted to the signal determiner 332.

The passenger compartment temperature-based blower control system 312 includes a bin separator 376 that receives the passenger compartment temperature signal 48 from the passenger compartment temperature sensor 46. The bin separator 376 includes a predetermined number of bins, such as bin 376a, each of which represents a range of passenger compartment temperature values. The bin separator 376 determines which bin 376a correlates to the passenger compartment temperature signal 48, and sends a correlating signal 378a to a bin calculator 380. The bin calculator 380 receives the valid learning point signal 302 and the blower learning rate signal 306 and inputs a valid learning point value from the valid learning point signal 302 into the corresponding bin 380a. The bin calculator 380 next calculates a new, updated value for the relevant bin 380a based on the valid learning point signal 302, the existing value within relevant bin 380a, and the blower learning rate signal 306. Finally, a passenger compartment temperature-based blower control characteristic calculator 384 inputs an updated value 382a from each of the respective bins 380a in order to determine a passenger compartment temperature-based blower control characteristic 390, which is inputted to the signal determiner 332.

The humidity-based blower control system 314 includes a bin separator 406 that receives the passenger compartment humidity signal 66 from the passenger compartment humidity sensor 58. The bin separator 406 includes a predetermined number of bins, such as bin 406a, each of which represents a range of passenger compartment humidity values. The bin separator 406 determines which bin 406a correlates to the passenger compartment humidity signal 66, and sends a correlating signal 408a to a bin calculator 410. The bin calculator 410 receives the valid learning point signal 302 and the blower learning rate signal 306 and inputs a valid learning point value from the valid learning point signal 302 into the corresponding bin 380a. The bin calculator 380 next calculates a new, updated value for the relevant bin 410a based on the valid learning point signal 302, the existing value within relevant bin 410a, and the blower learning rate signal 306. Finally, a passenger compartment humidity-based blower control characteristic calculator 414 inputs an updated value 412a from each of the respective bins 410a in order to determine a passenger compartment humidity-based blower control characteristic 420, which is inputted to the signal determiner 332.

Figure 5:
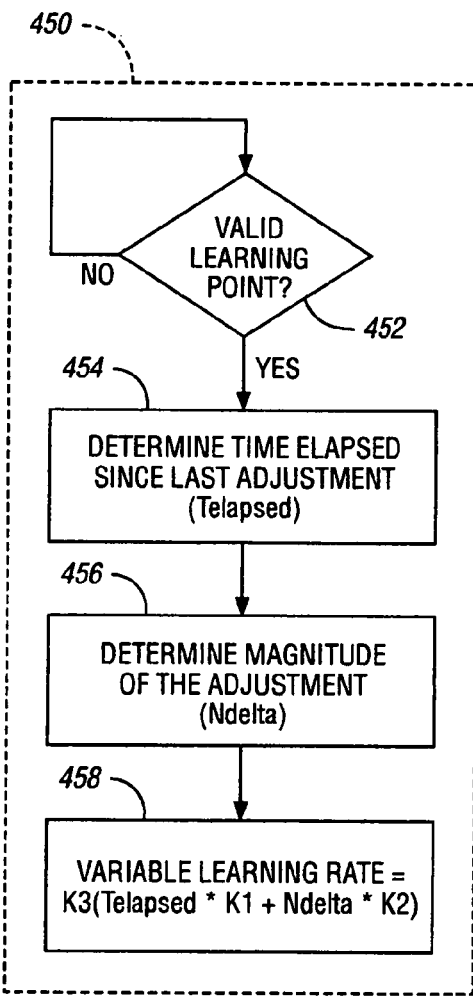
FIG. 5 is an alternative embodiment of a variable learning controller embodying the principles of the present invention.

FIG. 5 shows an alternative embodiment to the present invention. In this embodiment, a combined learning point detector and learning rate controller 450 first determines if a manual adjustment by the vehicle occupant is a valid learning point, and then determines the variable learning rate only if the manual adjustment was found to be a valid learning point. A first step 452 shown in FIG. 5 determines whether the manual adjustment is a valid learning point in a process similar to those described above. Unlike the temperature variable learning controller 92 and the blower variable learning controller 292, the combined learning point detector and learning rate controller 450 only analyzes valid learning points when determining the variable learning rate.

Once a valid learning point is found, a second step 454 determines the time elapsed since the previous manual adjustment. Unlike the air conditioner 10 described in FIG. 1, the combined learning point detector and learning rate controller 450 only determines one variable learning rate corresponding to both of the manual knobs 28, 34. Therefore, the value in the second step 454 corresponds to the previous adjustment of either of the manual knobs 28, 34. A third step 456 determines the magnitude of the adjustment of the manual knob 28, 34, and a fourth step 458 determines a variable learning rate.

The air conditioner 10 may also include a control system (not shown) to control another property of the air, besides passenger compartment temperature and blower setting, based on user preferences. One such property of the air is a preferred blower delivery mode. Air conditioners 10 typically include a series of vents 36 positioned at various points within the passenger compartment 18, such as a defrost vent, a lower vent, or an upper vent. Similarly to the manual blower knob 28 and the manual temperature knob 34, input from the manual delivery mode knob (not shown) will be inputted to a controller (not shown) to determine the vehicle occupant's preferred blower delivery mode at various environmental conditions. The controller may include a variable learning rate similar to the variable learning rates described above.

It is intended that the foregoing detailed description be regarded as illustrative rather than limiting, and that it be understood that it is the following claims, including all equivalents, that are intended to define the spirit and scope of this invention.

The invention claimed is:

1. An air conditioner for an automobile having a passenger compartment, the air conditioner comprising:
an air control system to control a property of air entering the passenger compartment;
a manual setting member through which the property of the air is manually controlled;
a control system that automatically controls the property of the air based on a control characteristic, wherein the control system updates the control characteristic based on an input from the manual setting member and based on a variable learning rate, wherein the variable learning rate is based on a first input from the manual setting member and a second input from the manual setting member, wherein the first input from the manual setting member corresponds to a time value measured between a first adjustment of the manual setting member and a second adjustment of the manual setting member, wherein the second input from the manual setting member corresponds to a magnitude of the second adjustment of the manual setting member;
a second air control system to control a second property of air entering the passenger compartment;
a second manual setting member through which the second property of the air is manually controlled; and
a second control system that automatically controls the second property of the air based on a second control characteristic, wherein the second control system updates the second control characteristic based on an input from the second manual setting member and based on the variable learning rate.

2. The air conditioner in claim 1, wherein the variable learning rate includes a second variable learning rate, wherein the second control system updates the second control characteristic based on an input from the second variable learning rate.

3. The air conditioner in claim 2, wherein the second variable learning rate is based on a first input from the second manual setting member and a second input from the second manual setting member, wherein the first input from the second manual setting member corresponds to a time value measured between a first adjustment of the second manual setting member and a second adjustment of the second manual setting member, wherein the second input from the second manual setting member corresponds to a magnitude of the second adjustment of the second manual setting member.

4. The air conditioner in claim 3, wherein the variable learning rate is determined by a formula that includes: $VLR=k1*(T_{elapsed}*k2+\Delta N*k3)$, wherein the VLR is the variable learning rate, the k1 is a constant, the k2 is a constant, the k3 is a constant, the $T_{elapsed}$ is the first input from the manual setting member, and the $\Delta N$ the second input from the manual setting member.

5. The air conditioner in claim 3, wherein the second variable learning rate is determined by the formula: $VLR2=k4*(T_{elapsed}*k5+\Delta N*k6)$, wherein the VLR2 is the second variable learning rate, the k4 is a constant, the k5 is a constant, the k6 is a constant, the $T_{elapsed}$ is the first input from the second manual setting member, and the $\Delta N$ the second input from the second manual setting member.

6. The air conditioner in claim 1, wherein the property of the air entering the passenger compartment is volumetric flow rate.

7. The air conditioner in claim 1, wherein the second property of the air entering the passenger compartment is temperature.

8. The air conditioner in claim 1, wherein the variable learning rate is based on a first input and a second input from at least one of the first manual setting member and the second manual setting member, wherein the first input from at least one of the first manual setting member and the second manual setting member corresponds to a time value measured between a first adjustment of one of the first manual setting member and the second manual setting member and a second adjustment of one of the first manual setting member and the second manual setting member, wherein the second input from the at least one of the first manual setting member and the second manual setting member corresponds to a magnitude of the second adjustment of one of the first manual setting member and the second manual setting member.

9. The air conditioner in claim 1 further comprising a measurement system to measure an environmental condition, and wherein the air control system is a blower that directs air into the passenger compartment at a volumetric flow rate, the manual setting member is a manual setting blower member through which the volumetric flow rate of the air directed into the passenger compartment is manually controlled and the control system automatically controls the volumetric flow rate of the air directed into the passenger compartment based on a the control characteristic, wherein the control characteristic is based on a plurality of preferred blower settings, wherein each of the plurality of preferred blower settings corresponds to a corresponding range of values of the environmental condition and each of the plurality of preferred blower settings is determined based on a signal from the manual setting blower member occurring when the environmental condition is within the corresponding range of values of the environmental condition, wherein the plurality of preferred blower settings are updated at the variable learning rate.

10. The air conditioner in claim 9, wherein the second air control system is a temperature controller to control the temperature of the air directed into the passenger compartment, the second manual setting member is a manual setting temperature member through which the temperature of the air directed into the passenger compartment is manually controlled and the second control system automatically controls the temperature of the air directed into the passenger compartment based on the second control characteristic, wherein the second control characteristic is based on a plurality of preferred temperature settings, wherein each of the plurality of preferred temperature settings corresponds to the corresponding range of values of the environmental condition and each of the plurality of preferred temperature settings is determined based on a signal from the manual setting temperature member occurring when the environmental condition is within the corresponding range of values of the environmental condition, wherein the plurality of preferred temperature settings are updated at the variable learning rate.

11. The air conditioner in claim 10, wherein the control characteristic is an algorithm corresponding to the plurality of preferred blower settings, wherein the algorithm is determined using a least squares curve fit calculation.

12. The air conditioner in claim 11, wherein the second control characteristic is a second algorithm corresponding to the plurality of preferred temperature settings, wherein the second algorithm is determined using the least squares curve fit calculation.

13. The air conditioner in claim 10, further comprising:
a second measurement system to measure a second environmental condition;
wherein the control system controls the volumetric flow rate of the air directed into the passenger compartment is based on a third control characteristic, wherein the third control characteristic is based on a second plurality of preferred blower settings, wherein each of the second plurality of preferred blower settings corresponds to a second corresponding range of values of the second environmental condition and each of the second plurality of preferred blower settings is determined based on the signal from the manual setting blower member occurring when the second environmental condition is within the second corresponding range of values of the second environmental condition, wherein the second plurality of preferred blower settings are updated at the variable learning rate.

14. The air conditioner in claim 13, wherein the second control system that automatically controls the temperature of the air directed into the passenger compartment is based on a fourth control characteristic, wherein the fourth control characteristic is based on a second plurality of preferred temperature settings, wherein each of the second plurality of preferred temperature settings corresponds to the second corresponding range of values of the second environmental condition and each of the second plurality of preferred temperature settings is determined based on the signal from the manual setting temperature member occurring when the second environmental condition is within the second corresponding range of values of the second environmental condition, wherein the second plurality of preferred temperature settings are updated at the variable learning rate.

15. The air conditioner in claim 14, wherein the environmental condition is selected from a group consisting of an ambient temperature adjacent the automobile, a sun load adjacent to the automobile, a temperature in the passenger compartment of the automobile, and a humidity in the passenger compartment of the automobile; and
wherein the second environmental condition is selected from a group consisting of an ambient temperature adjacent the automobile, a sun load adjacent to the automobile, a temperature in the passenger compartment of the automobile, and humidity in the passenger compartment of the automobile.

16. The air conditioner in claim 14, further comprising:
a third measurement system to measure a third environmental condition;
wherein the control system controls the volumetric flow rate of the air directed into the passenger compartment is based on a fifth control characteristic, wherein the fifth control characteristic is based on a third plurality of preferred blower settings, wherein each of the third plurality of preferred blower settings corresponds to a third corresponding range of values of the third environmental condition and each of the third plurality of preferred blower settings is determined based on the signal from the manual setting blower member occurring when the third environmental condition is within the third corresponding range of values of the third environmental condition, wherein the third plurality of preferred blower settings are updated at the variable learning rate.

17. The air conditioner in claim 16, wherein the second control system that automatically controls the temperature of the air directed into the passenger compartment is based on a sixth control characteristic, wherein the sixth control characteristic is based on a third plurality of preferred temperature settings, wherein each of the third plurality of preferred temperature settings corresponds to the third corresponding range of values of the third environmental condition and each of the third plurality of preferred temperature settings is determined based on the signal from the manual setting temperature member occurring when the third environmental condition was within the third corresponding range of values of the third environmental condition, wherein the third plurality of preferred temperature settings are updated at the variable learning rate.

18. The air conditioner in claim 17, wherein the environmental condition is selected from a group consisting of an ambient temperature adjacent the automobile, a sun load adjacent to the automobile, a temperature in the passenger compartment of the automobile, and a humidity in the passenger compartment of the automobile;

wherein the second environmental condition is selected from a group consisting of an ambient temperature adjacent the automobile, a sun load adjacent to the automobile, a temperature in the passenger compartment of the automobile, and a humidity in the passenger compartment of the automobile; and wherein the third environmental condition is selected from a group consisting of an ambient temperature adjacent the automobile, a sun load adjacent to the automobile, a temperature in the passenger compartment of the automobile, and humidity in the passenger compartment of the automobile.

19. The air conditioner in claim 9, wherein the environmental condition is selected from a group consisting of an ambient temperature adjacent the automobile, a sun load adjacent to the automobile, a temperature in the passenger compartment of the automobile, and humidity in the passenger compartment of the automobile.

\* \* \* \* \*